United States Patent [19]

Ling et al.

[11] Patent Number: 4,811,164
[45] Date of Patent: Mar. 7, 1989

[54] MONOLITHIC CAPACITOR-VARISTOR

[75] Inventors: Hung C. Ling, Belle Mead; Man F. Yan, Berkeley Heights, both of N.J.

[73] Assignee: American Telephone and Telegraph Company, AT&T Bell Laboratories, Murray Hill, N.J.

[21] Appl. No.: 173,857

[22] Filed: Mar. 28, 1988

[51] Int. Cl.[4] .................. H01C 7/10; C04B 33/32; H01B 1/06; H01G 4/10
[52] U.S. Cl. ................................. 361/321; 338/21; 29/25.42; 264/61; 252/518
[58] Field of Search .................. 264/61; 338/20, 21; 361/311–313, 320, 321, 272; 252/518, 520; 29/25.42

[56] References Cited

U.S. PATENT DOCUMENTS

| | | | |
|---|---|---|---|
| 4,041,436 | 8/1977 | Kouchich et al. | 338/21 |
| 4,097,834 | 6/1978 | Mar et al. | 338/21 |
| 4,296,002 | 10/1981 | Sokoly et al. | 338/20 X |
| 4,320,379 | 3/1982 | Yodogawa | 338/21 |
| 4,400,683 | 8/1983 | Eda et al. | 338/21 |
| 4,461,844 | 7/1984 | Itakura et al. | 361/321 X |
| 4,541,974 | 9/1985 | Yamaoka et al. | 264/61 |

FOREIGN PATENT DOCUMENTS

| | | | |
|---|---|---|---|
| 137011 | 10/1979 | Japan | 361/321 |
| 107201 | 8/1980 | Japan | 338/21 |

OTHER PUBLICATIONS

"Grain Boundary Phenomena in Electronic Ceramics", *Advances in Ceramics*, vol. 1, L. M. Levinson and D. C. Hill, The American Ceramic Society, Inc. Columbus, Ohio, pp. 349-358, (1981).
NEC Electron Device Specification Sheet—Multilayer-Type Metal Oxide Varistor.
*Ceramic Dielectrics and Capacitors*, J. M. Herbert, Gordon and Breach Science Publishers, New York, pp. 78-81, 188-189 (1985).

*Primary Examiner*—Donald A. Griffin
*Attorney, Agent, or Firm*—Roderick B. Anderson

[57] ABSTRACT

A multilayer protective device is made by including a varistor composition (35) between a first plurality of interdigitated electrodes (30, 32) and a capacitor composition (36) between a second plurality of electrodes of the same device. The two compositions are chosen to have optimum sintering temperatures within about 10 percent of each other. Simultaneous sintering solidifies and laminates the two compositions into a single monolithic device.

18 Claims, 2 Drawing Sheets

MONOLITHIC CAPACITOR-VARISTOR

FIELD OF THE INVENTION

This invention relates to protective devices, and more particularly, to ceramic capacitors and ceramic varistors.

BACKGROUND OF THE INVENTION

Protective devices are widely used in parallel with electronic information processing circuits to protect them against spurious voltage surges and voltage transients. Capacitors are normally used to protect such circuits against high frequency voltage transients which could cause errors in signal processing or in stored signals. Threshold devices such as Zener diodes are normally used to protect such circuits against high amplitude, low-frequency voltage surges which could otherwise cause permanent physical damage to the circuits. Thus, many circuits require both a capacitor and a Zener diode in parallel for proper protection.

The multilayer ceramic capacitor is becoming increasing popular as a protective device because of its high capacitance and its relatively compact size. Ceramic capacitors are normally made by sandwiching layers of metal paste between layers of a ceramic capacitor composition and then sintering the unit to stabilize both the metal, which thereafter constitutes capacitor electrodes, and the high dielectric ceramic capacitor composition. Alternate metal electrodes are then attached to one terminal electrode, and the remaining electrodes are attached to an opposite terminal electrode such that the metal electrodes extending from the terminal electrodes are interdigitated, and a high total capacitance is presented between the two terminal electrodes.

Zener diodes are devices in which a band-gap material such as silicon is contained between opposite terminal electrodes. When the voltage across the terminal electrodes exceeds a threshold value, the resistance of the device abruptly decreases, thus shunting current from the circuit being protected.

A known device that could be used in place of the Zener diode is the varistor, a device that has generally the same external electrical characteristic as the Zener diode, but which operates on a different principle. As will be explained later, a varistor may be a ceramic device in which current conduction occurs by electron tunneling through grain boundaries when the applied external voltage exceeds some threshold value.

A well-known trend in recent times is the increased microminiaturization of electronic circuits, to the point at which an entire electronic system can be contained on a single silicon chip. While multilayer ceramic capacitors are more compact than other comparable capacitors, the ceramic capacitor and Zener diode in parallel with an electronic circuit are often bulkier than the circuit they are protecting. Since the miniaturization of protective devices has not kept pace with the miniaturization of electronic circuits, there is clearly a well-recognized need for further miniaturization of protective devices.

SUMMARY OF THE INVENTION

The present invention gives greaer miniaturization by combining a ceramic capacitor and a ceramic varistor into a single monolithic device using the multilayer ceramic capacitor technology. The resulting device gives protection against both high frequency and high amplitude voltage surges.

Specifically, by adding varying amounts of oxide additives to zinc oxide, one can obtain a zinc oxide ceramic having a sintering temperature which matches the sintering temperatures of various ceramic capacitor compositions. In a multilayer capacitor structure, the space between at least two of the electrodes contains a varistor composition while the space between the remaining metal electrodes of the structure contains a ceramic capacitor composition. The two compositions are then sintered in one operation. Preferably, the varistor and capacitor compositions are separately calcined prior to assembly so as to prevent spurious chemical reactions between the varistor and capacitor compositions prior to sintering. Through sintering, the two ceraamic compositions are solidified and laminated to form a single monolithic device.

These and other objects, features and advantages of the invention will be better understood from a consideration of the following detailed description taken in conjunction with the accompanying drawing.

DRAWING DESCRIPTION

DETAILED DESCRIPTION

Figure 1:
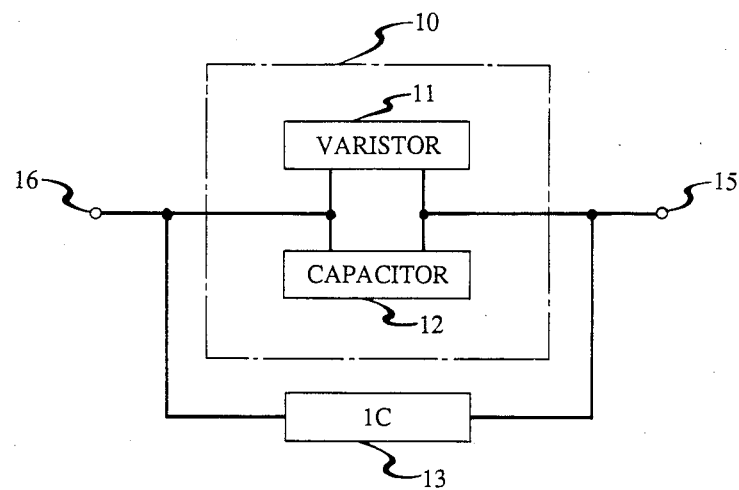
FIG. 1 is a circuit diagram of a combined varistor and capacitor made in accordance with the invention which is ussed as a protective device for an integrated circuit.

Schematically FIG. 1 illustrates a protective device 10 in accordance with the invention which provides the electrical functions of a varistor 11 in parallel with a capacitor 12. The protective device may be used, for example, to provide electrical protection to an integrated circuit chip 13 connected in parallel with the protective device. The protective device provides protection between end terminals 15 and 16 so that high frequency voltage transients between these terminals are shunted through capacitor 12 rather than through the protected device 13, and low-frequency or direct-current voltages that exceed a threshold value will be shunted through the varistor 11.

Figure 2:
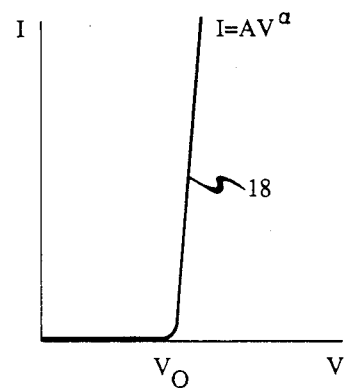
FIG. 2 is a current-voltage characteristic of the varistor of FIG. 1.

FIG. 2 shows the current-voltage characteristic 18 of the varistor 11. At low operating voltages, the varistor does not conduct current and acts as an open circuit; however, at a high voltage exceeding a threshold value $V_0$, the varistor conducts current in accordance with the relationship:

$$I = AV^\alpha$$

where A is a proportionately constant and $\alpha$ is the index of nonlinearity. Thus, at high voltages, the varistor is highly conductive.

As is known, zinc oxide ceramics with appropriate dopants have useful varistor properties and have a large nonlinearity index $\alpha$, ranging from 2.0 to 50. The nonlinear electrical conduction in ZnO ceramic results from electron tunneling through each grain boundary. Thus, in a ZnO ceramic specimen of thickness t, the minimum voltage $V_0$ required to initiate nonlinear electrical conduction is $$V_0 \approx 3.25 t/G \text{ volt}$$
(2)

where G is the average grain thickness of the ceramic specimen. The ceramic microstructure of zinc oxide has a typical grain size of 10 micrometers. Thus, a layer 1-2 mils (25-50 micrometers) thick would give a threshold voltage $V_0$ of 8-16 volts.

Figure 3:
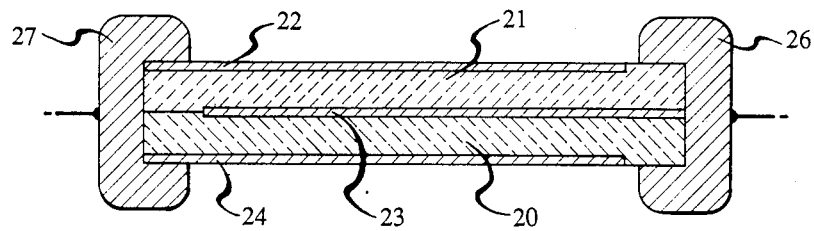
FIG. 3 is a schematic diagram showing in cross-section a combined varistor-capacitor in accordance with one embodiment of the invention.

As illustrated in FIG. 3, a combined varistor and capacitor may be made, in accordance with one embodiment of the invention, by including a ceramic capacitor composition 20 and a ceramic varistor composition 21 within a unitary device. The ceramic varistor composition is contained between electrodes 22 and 23, and the capacitor composition is contained between electrodes 23 and 24. Electrode 23 is connected to terminal electrode 26, and electrodes 22 and 24 are connected to terminal electrode 27. Thus, the device is capable as operating as a varistor in parallel with a capacitor, with both devices being connected between terminal electrodes 26 and 27.

The device of FIG. 3 is made, in accordance with the invention, through the use of known multilayer ceramic capacitor fabrication techniques. The ceramic capacitor composition 20 is made in the form of a "slip" by mixing an appropriate calcined dielectric in powder form in an organic medium which may contain a polymer, a plasticizer and a parting agent. Then the electrodes 23 and 24 are applied, for example, by silk-screening with a metal suspension. As known, calcining chemically stabilizes the dielectric powder and is normally accomplished by appropriate heating.

The varistor portion is made in the same manner; that is, a zinc oxide ceramic powder is calcined, mixed in an appropriate organic medium, formed to a slip, and then coated with the electrode 22. The two unsintered ceramic slips 20 and 21 are stacked under pressure and sintered by heating the unit to form the two slips into a single unitary structure. The conventional method for making multilayer ceramic capacitor structures is described, for example, in the publication, "Ceramic Dielectrics and Capacitors," by J. M. Herbert, Gordon and Breach Science Publishers (1985). As known, the electrodes are preferably of a high melting point metal such as platinum or palladium-silver alloys, which can withstand the sintering temperatures. Through sintering, both ceramics are structurally solidified and laminated together. Thereafter, the terminal electrodes 26 and 27 are applied.

It is possible to sinter simultaneously the varistor and capacitor compositions because we have found that (1) with calcining before sintering, one can avoid chemical reactions between the capacitor and varistor compositions, and (2) with appropriate additives in zinc oxide, one can tailor the varistor composition so as to have an optimum sintering temperature that matches that of the capacitor composition.

For the varistor composition 21, zinc oxide, with varying amounts of oxide additives, gives a sintering temperature of from 950° C. to 1350° C. depending on the types and concentrations of the additives. Various examples of zinc oxide compositions are given in the "Japanese Journal of Applied Physics," M. Matsuoka, Volume 10, Pages 736-746 (1971); the characteristics of these zinc oxide compositions are summarized in the following table:

TABLE I

| | ZINC OXIDE COMPOSITIONS | | |
|---|---|---|---|
| Additives | (Mole %) | Sintering Temperature (°C.) | Non-Linear Exponent α |
| $Bi_2O_3$ | (0.5) | 1150 | 4.0 |
| $Sb_2O_3$ | (0.5) | 1150 | 3.1 |
| $Bi_2O_3$ | (0.5) | 1250 | 13 |
| CoO | (0.5) | | |
| $Bi_2O_3$ | (0.5) | 1350 | 18 |
| MnO | (0.5) | | |
| $Bi_2O_3$ | (0.5) | 1250 | 21 |
| CoO | (0.5) | | |
| MnO | (0.5) | | |
| $Cr_2O_3$ | (0.5) | | |
| $Bi_2O_3$ | (0.5) | 950 to 1350 | 20 to 50 |
| CoO | (0.5) | | |
| MnO | (0.5) | | |
| $Cr_2O_3$ | (0.5) | | |
| $Sb_2O_3$ | (1.0) | | |

We have found that if the optimum sintering temperatures of the varistor and capacitor compositions are within about 10 percent, dependable unitary structures giving appropriate varistor and capacitor characteristics can be made. With the varistor composition being at least 97 mole percent zinc oxide, various additives will give various sintering temperatures that can be made to match that of a desired capacitor composition. Commercially available capacitor dielectrics based on barium titanate ($BaTiO_3$) have sintering temperatures of from 1150° C. to 1350° C. As described for example in the publication "Ceramic Bulletin," Y. Enomoto and A. Yamagi, Volume 60, Pages 566-570 (1981), barium titanate doped with $Dy_2O_3$ has an optimum sintering temperature of 1350° C. As described in the "Journal of the American Ceramic Society," S. L. Schwartz, T. R. Shrout, W. A. Schultze, L. E. Cross, Volume 67, Pages 311-315 (1984), a capacitor composition having the formula $Pb(Mg_{\frac{1}{3}}Nb_{\frac{2}{3}})O_3$ has a sintering temperature of 1250° C. The publication, "Ceramic Bulletin," M. Yonezawa, Volume 62, Pages 1375-1379 (1983), describes a ceramic capacitor composition having the formulation $Pb(Fe_{\frac{1}{2}}Nb_{\frac{1}{2}})O_3\text{-}Pb(Fe_{\frac{2}{3}}W_{\frac{1}{3}})O_3$, which gives an optimum sintering temperature of 950° C. to 1050° C. Thus, the following doped zinc oxide varistor materials may be used in combination with the following capacitor materials:

TABLE II

| Varistor-Capacitor Composition Combinations | | | |
|---|---|---|---|
| ZnO Varistor Material Additive | (Mole %) | Sintering Temperature (°C.) | Capacitor Material |
| $Sb_2O_3$ | (1.0) | 1350 | $Dy_2O_3$ Doped $BaTiO_3$ |
| $Cr_2O_3$ | (0.5) | | |
| MnO | (0.5) | | |
| CoO | (0.5) | | |
| $Bi_2O_3$ | (0.5) | | |
| $Cr_2O_3$ | (0.5) | 1250 | $Pb(Mg_{\frac{1}{3}}Nb_{\frac{2}{3}})O_3$ |
| MnO | (0.5) | | |
| CoO | (0.5) | | |
| $Bi_2O_3$ | (0.5) | | |
| $Sb_2O_3$ | (1.0) | 950-1050 | $Pb(Fe_{\frac{1}{2}}Nb_{\frac{1}{2}})O_3$ — $Pb(Fe_{\frac{2}{3}}W_{\frac{1}{3}})O_3$ |
| $Cr_2O_3$ | (0.5) | | |
| MnO | (0.5) | | |
| CoO | (0.5) | | |
| $Bi_2O_3$ | (0.5) | | |

All of the above ceramic materials have dielectric constants in excess of 10,000.

Figure 4:
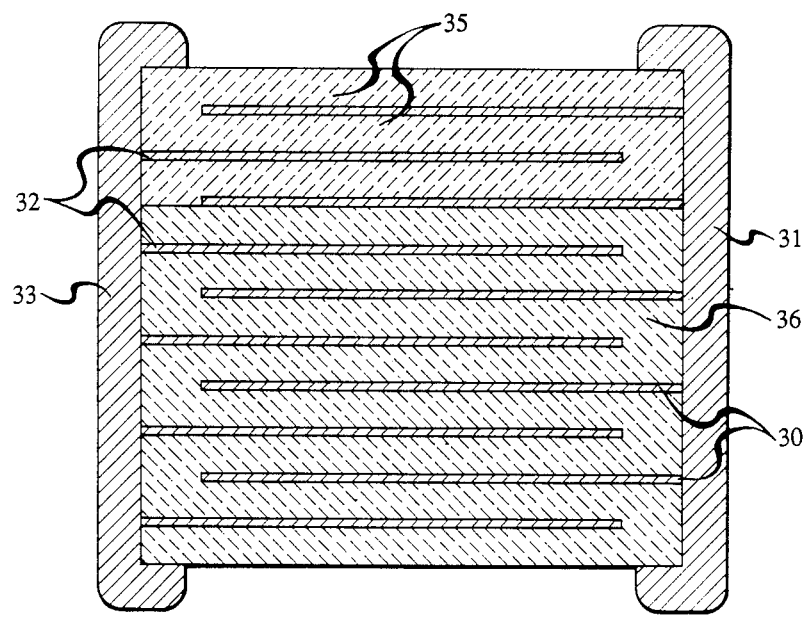
FIG. 4 is a schematic diagram showing in cross-section a combined varistor and capacitor in accordance with another embodiment of the invention.

FIG. 4 illustrates a preferred embodiment for the invention in which a plurality of electrodes 30 extend from a terminal electrode 31 and are interdigitated with a plurality of electrodes 32 extending from terminal electrode 33. Included between one of the electrodes 32 and two of the electrodes 30 is a ceramic varistor composition 35, while between the remaining interdigitated electrodes 30 and 32 there is a ceramic capacitor composition 36.

The embodiment of FIG. 4 is made in the same general manner as that of FIG. 3. The various unsintered ceramic slips of appropriate composition are coated with electrode material, stacked under pressure, and sintered so as to form the laminated multilayer structure shown. Thereafter, the termination electrodes 31 and 33 are applied.

The FIG. 4 embodiment is preferred because a large number of capacitor layers greatly increases device capacitance without adding proportionately to the device bulk. The use of a plurality of varistor layers gives greater varistor current-carrying capacitor and design capability consistent with the constraints of Equation (2). Notice that the plurality of varistor layers gives the equivalent of a plurality of varistors connected in parallel. The actual number of layers shown is intended to be merely illustrative and not definitive of the preferred embodiment.

In one embodiment of the FIG. 4 apparatus that was made, the ceramic composition was a solid solution of 67 percent $Pb(Fe_{\frac{1}{2}}Nb_{\frac{1}{2}})O_3$ and 33 percent $Pb(Fe_{\frac{2}{3}}W_{\frac{1}{3}})O_3$ with a dielectric constant of 27000–32000 at 25° C. A 0.7 percent cobalt dopant was introduced to decrease the dissipation factor. For the varistor composition 35, zinc oxide powder was doped with 2 percent Sb, 1 percent Cr, 1 percent Bi, 0.5 percent Co, and 0.5 percent Mn. The ceramic slips of both compositions were prepared by tape casting of powder slurries in acrylic-based organic binders which were laminated together and sintered at 1050° C. in $O_2$ for two hours. Four layers of zinc oxide and eight layers of capacitor composition were used. Each of the layers was about 38 micrometers thick. The monolithic device had a large capacitance value of about 1 microfarad and a reasonably low dissipation factor of 0.08 at frequencies ranging from one kilohertz to one megahertz. The nonlinear index $\alpha$ for the varistor composition was calculated to be about 11.4.

The various embodiments shown and described are intended to be illustrative of the invention. In particular, Table II is just a short list giving illustrative possible combinations of zinc oxide compositions with various capacitor compositions. It is clear that many other combinations of additives to ZnO could be used for tailoring its sintering temperature; and the number of known ceramic capacitor compositions is too large to list herein without undue prolixity. Various other embodiments and modifications may be devised by those skilled in the art without departing from the spirit and scope of the invention.

What is claimed is:

1. A process for making a multilayer electronic device comprising the steps of forming an unsintered ceramic composition between a plurality of metal electrodes arranged as at least one first electrode interdigitated with at least two second electrodes, sintering the composition, and fixing a first terminal electrode to a first end of the first electrodes and a second terminal electrode to a second end of the second metal electrodes characterized in that the unsintered ceramic composition between at least one of the first electrodes and at least on e of the second electrodes is a capacitor composition; the unsintered ceramic composition between at least one first electrode and at least one second electrode is a varistor composition which is compositionally significantly different from the capacitor composition; and the varistor composition and the capacitor composition are sintered simultaneously, thereby to form a combined capacitor and varistor structure.

2. The process of claim 1 further characterized in that the varistor composition consists of at least 97 mole percent of zinc oxide.

3. The process of claim 2 further characterized in that the varistor composition has an optimum sintering temperature within about ten percent of the optimum sintering temperature of the capacitor composition.

4. The process of claim 3 further characterized in that the varistor composition and the capacitor composition each has an optimum sintering temperature of between 950° C. and 1350° C.

5. The process of claim 4 further characterized in that the varistor composition is formed between one first electrode and two second electrodes and the capacitor composition is formed between a plurality of first electrodes and a plurality of second electrodes.

6. The process of claim 4 further characterized in that the varistor composition is formed as a plurality of layers, the capacitor composition is formed as a plurality of layers, the layers are stacked, and the metal electrodes are arranged such that there is one electrode between each contiguous pair of layers.

7. The process of claim 4 further characterized in that the varistor composition comprises zinc oxide containing at least one additive selected from the group consisting of $Bi_2O_3$, $Sb_2O_3$, CoO, MnO, and $Cr_2O_3$.

8. The process of claim 7 further characterized in that the capacitor composition is selected from the group consisting of $BaTiO_3$, $Pb(Mg_{\frac{1}{3}}Nb_{\frac{2}{3}})O_3$, and $Pb(Fe_{\frac{1}{2}}Nb_{\frac{1}{2}})O_3$—$Pb(Fe_{\frac{2}{3}}W_{\frac{1}{3}})O_3$.

9. A multilayer device comprising layers of ceramic capacitor composition between a plurality of metal electrodes arranged as a plurality of first electrodes interdigitated with a plurality of second electrodes, a first terminal electrode connected to one end of the first metal electrodes and a second terminal electrode opposite the first terminal electrode connected to one end of the second metal electrodes characterized by a ceramic varistor composition of a significantly different material from that of the capacitor composition, the varistor composition being contained between at least one first electrode connected to the first terminal electrode and at least one second electrode connected to the second terminal electrode, whereby the first and second terminals are electrically coupled by a capacitor in parallel with a varistor.

10. The device of claim 9 further characterized in that the ceramic varistor composition comprises predominantly zinc oxide and the capacitor composition is selected from the group consisting of $BaTiO_3$, $Pb(Mg_{\frac{1}{3}}Nb_{\frac{2}{3}})O_3$ and a solid solution of $Pb(Fe_{\frac{1}{2}}Nb_{\frac{1}{2}})O_3$ and $Pb(Fe_{\frac{2}{3}}W_{\frac{1}{3}})O_3$.

11. The device of claim 10 further characterized in that the ceramic varistor composition has a non-linear exponent parameter $\alpha$ of between 4 and 50, and the ceramic capacitor composition has a dielectric constant in excess of 10,000.

12. The device of claim 9 further characterized in that the ceramic varistor composition and ceramic capacitor composition are made by including an unsintered varistor composition between certain first and second electrodes and an unsintered capacitor composition between the remaining first and second electrodes, and sintering the varistor and ceramic compositions simultaneously.

13. An electronic device made by a process comprising the steps of forming an unsintered ceramic composition between a plurality of metal electrodes arranged as at least one first electrode interdigitated with at least two second electrodes, sintering the composition, and fixing a first terminal electrode to a first end of the first electrodes and a second terminal electrode to a second end of the second metal electrodes characterized in that the unsintered ceramic composition between at least one of the first electrodes and at least one of the second electrodes is a capacitor composition; the unsintered ceramic composition between at least one first electrode and at least one second electrode is a varistor composition which is significantly different from the capacitor composition; and the varistor composition and the capacitor composition are sintered simultaneously, thereby to form a combined capacitor and varistor structure.

14. The electronic device of claim 13 further characterized in that the varistor composition consists of at least 97 mole percent of zinc oxide.

15. The electronic device of claim 14 further characterized in that varistor composition has an optimum sintering temperature within about ten percent of the optimum sintering temperature of the capacitor composition.

16. An electronic device comprising: a first terminal electrode comprising a plurality of parallel branches; a second electrode comprising a plurality of parallel branches; branches of the first electrode being interleaved with branches of the second electrode; a ceramic varistor composition being included between two or more first branches; a ceramic capacitor composition being included between two or more second branches; the second branches being different from the first branches; and the varistor composition being materially different from the capacitor composition.

17. The electronic device of claim 16 wherein: the ceramic capacitor and the ceramic varistor compositions are sintered simultaneously.

18. The electronic device of claim 16 wherein: the varistor composition is formed as a plurality of layers; the capacitor composition is formed as a plurality of layers; the layers are stacked; and the electrode branches are arranged such that there is one branch between each contiguous pair of layers.

* * * * *

UNITED STATES PATENT AND TRADEMARK OFFICE
CERTIFICATE OF CORRECTION

PATENT.NO. : 4,811,164
DATED : March 7, 1989
INVENTOR(S) : H. C. Ling and M. F. Yan It is certified that error appears in the above—identified patent and that said Letters Patent is hereby corrected as shown below:

Column 1, Line 65, "greaer" should read --greater--.

Column 5, Line 19, "capacitor" should read --capacity--.

Signed and Sealed this

Eighteenth Day of July, 1989

Attest:

DONALD J. QUIGG

Attesting Officer

Commissioner of Patents and Trademarks